US009142192B2

(12) United States Patent
Hou

(10) Patent No.: US 9,142,192 B2
(45) Date of Patent: Sep. 22, 2015

(54) SIMULATION OF WEB APPLICATIONS AND SECONDARY DEVICES IN A WEB BROWSER, WEB APPLICATION DEVELOPMENT TOOLS, AND METHODS USING THE SAME

(75) Inventor: Zhaorong Hou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 13/245,258

(22) Filed: Sep. 26, 2011

(65) Prior Publication Data

US 2013/0076797 A1    Mar. 28, 2013

(51) Int. Cl.
G09G 5/00 (2006.01)
G09G 5/14 (2006.01)
G06F 9/44 (2006.01)

(52) U.S. Cl.
CPC .. *G09G 5/14* (2013.01); *G06F 8/34* (2013.01); *G09G 2340/045* (2013.01); *G09G 2370/022* (2013.01); *G09G 2380/14* (2013.01)

(58) Field of Classification Search
CPC ...................................................... G06F 9/455
See application file for complete search history.

(56) References Cited

U.S. PATENT DOCUMENTS

| 5,778,403 | A | 7/1998 | Bangs |
| 6,993,575 | B2 | 1/2006 | Abkowitz et al. |
| 7,546,131 | B1 * | 6/2009 | Sidi et al. ...................... 455/466 |
| 7,689,908 | B2 * | 3/2010 | Yan et al. ...................... 715/238 |
| 8,489,872 | B1 * | 7/2013 | Kapoor ........................ 713/100 |
| 8,589,140 | B1 * | 11/2013 | Poulin ............................ 703/22 |
| 2004/0027377 | A1 | 2/2004 | Hays et al. |
| 2008/0256468 | A1 | 10/2008 | Peters |
| 2009/0075697 | A1 * | 3/2009 | Wilson et al. .................. 455/557 |
| 2009/0228838 | A1 | 9/2009 | Ryan et al. |
| 2011/0052007 | A1 * | 3/2011 | Chen et al. .................... 382/103 |
| 2011/0257958 | A1 * | 10/2011 | Kildevaeld ....................... 703/23 |
| 2013/0024251 | A1 * | 1/2013 | Preiss et al. .................. 705/14.4 |
| 2013/0096906 | A1 * | 4/2013 | Niemeyer et al. ............... 703/23 |

FOREIGN PATENT DOCUMENTS

WO     2009143294 A2    11/2009

OTHER PUBLICATIONS

U.S. Appl. No. 13/245,272, filed Sep. 26, 2012, 60 pages.
International Preliminary Report on Patentability and Written Opinion from related PCT/US2012/055713 mailed Apr. 1, 2014.
International Search Report and Written Opinion from related PCT/US2012/055713 mailed Mar. 4, 2013.
European Search Report from related U.S. Appl. No. PCT/US2012/055713, dated Mar. 27, 2015, 8 pages.

* cited by examiner

*Primary Examiner* — David H Chu
(74) *Attorney, Agent, or Firm* — Grossman, Tucker Perreault & Pfleger, PLLC

(57) ABSTRACT

Device simulators and methods for using the same are disclosed. In some embodiments, the device simulators are capable of permitting accurate pixel to pixel and inch to inch mapping between a simulated display and a display of a target device. Web application development tools utilizing such simulators are also disclosed. In some embodiment, such web application development tools provide a convenient method to convert electronic document source files to interactive document web applications for multiple operating systems and form factors.

20 Claims, 12 Drawing Sheets

```
// jQuery function to set real-time event handler of the slider
$("#slider").slider({   // jQuery library will look up the placeholder with id "slider" and display it as slider
range: "max",
value: 70,      // set the initial value of the slider to 70
min: 40,        // set the minimum value of the slider (on the left end) to 40
max: 100,       // set the maximum value of the slider (on the right end) to 100
            slide : function(event, ui) {
                    // convert slider position to zoom factor
                    var zoomfac = ui.value / 100;
                    // apply zoom factor on the overall preview area
            var divPreviewArea = $("#preview_area");
            if(deviceHelper.is_firefox) {
                    // apply zoom factor on scale attribute in Firefox
                    divPreviewArea.css("-moz-transform","scale("+zoomfac+")");
                    divPreviewArea.css("-moz-transform-origin","0 0");
            } else {
                    // apply zoom factor on scale attribute in other browsers
                    divPreviewArea.css("zoom",zoomfac);
            }
                    // apply zoom factor on the IFRAME
            var frame = $("#iframe");
            var w = "";
            var h = "";
            if(this.is_ie) {
                    // If browser is IE9, apply zoom factor on scale attribute
                    frame.css("-moz-transform","scale("+zoomfac +")");
            frame.css("-webkit-transform","scale("+zoomfac +")");
            frame.css("-o-transform","scale("+zoomfac +")");
                    w = "none";
                    h = "none";
            } else if(this.is_chrome) {
                    // If browser is Chrome, apply zoom factor on scale attribute
                    // and adjust width and height attribute
                    frame.css("-webkit-transform","scale("+zoomfac +")");
                    var w = Math.round(res_width/zoomfac*(1/zoomfac))+"px";
                    var h = Math.round(res_height/zoomfac*(1/zoomfac))+"px";
            } else if(this.is_safari) {
                    // If browser is Safari, apply zoom factor on scale attribute
                    // and adjust width and height attribute
                    frame.css("-webkit-transform","scale("+zoom_fac+")");
                    if(this.is_safari_win){
                    var w = Math.round(res_width/zoom_fac) + "px";
                    var h = Math.round(res_height/zoom_fac) + "px";
                    } else {
                      var w = Math.round(res_width/zoom_fac*(1/zoom_fac))+"px";
                      var h = Math.round(res_height/zoom_fac*(1/zoom_fac))+"px";
                    }
            } else if(this.is_firefox) {
                    // If browser is Firefox, set scale to 1.0 and use original
                    // width and height attributes
                    frame.css("-moz-transform","scale(1.0)");
                    var w = Math.round(res_width) + "px";
                    var h = Math.round(res_height) + "px";
            }
            frame.css("width", w);
            frame.css("height", h);
            }
});
```

FIG 3

SIMULATION OF WEB APPLICATIONS AND SECONDARY DEVICES IN A WEB BROWSER, WEB APPLICATION DEVELOPMENT TOOLS, AND METHODS USING THE SAME

FIELD

The present disclosure relates generally to device simulation and web application development for multiple operating systems and form factors.

BACKGROUND

A web application is a computer software application that is hosted in a browser controlled environment (e.g., a Java applet), or which is coded in a browser supported language such as, for example, JAVASCRIPT®, hypertext markup language (HTML) or the like. Such applications are popular due to the widespread and cross platform use of web browsers. Indeed, web browsers are frequently used in many popular operating systems ("OS" or "OSes") such as, for example, the WINDOWS® OS sold by MICROSOFT®, the MAC OS® sold by APPLE®, and the ANDROID® OS sold by GOOGLE®. They are also used in devices falling within a wide range of form factors, such as, for example, desktop computers, laptop computers, tablet personal computers ("PC" or "PCs"), and handheld devices (e.g., mobile phones, smart phones, etc.)

Web applications are increasingly being developed using authoring tools that are web applications themselves, i.e., which are hosted in a web browser. Often, such authoring tools take the form of a device simulator that is displayed in a web browser running on a development system. The device simulator includes an image or images of the bezel of a target device (e.g., a mobile phone, a table PC, etc). The web application under development is displayed within the image of the bezel of the target device. In this way, the simulator allows a developer to preview the web application under development in the context of the bezel of the target device.

For a device simulator to accurately represent how the web application will appear on a target device, it needs to be capable of two types of mapping. First, the device simulator must be capable of pixel-to-pixel mapping, wherein one pixel of a simulated display in the device simulator (hereafter, "simulated display") correlates to one pixel on the display of the target device (hereafter, "target display"). Second, inch-to-inch (i.e., physical) mapping is needed, wherein one inch of a simulated display correlates to one inch of a target display.

While existing authoring tools are useful, they are not capable of accurate inch-to-inch mapping. This is due to the fact that accurate inch-to-inch mapping requires information regarding the number of pixels per inch (PPI) of the simulated display, or in other words, the display of a development system that is running the device simulator. In many instances, the PPI of the simulated display is unknown. Regardless, mapping the PPI of a development display to the PPI of a target display can be difficult, even if the PPI of the development display is known.

In addition, existing web application development tools do not provide a straightforward mechanism for converting electronic documents such as, for example, e-books to interactive document applications for multiple OSes and/or form factors at the same time. Rather, existing web application development tools generally require an application developer to use different tools to generate applications for individual OSes. Such a process can be cumbersome and inconvenient, and can produce interactive document applications that have inconsistent user interfaces between OSes and/or form factors. Moreover, many existing utilities for converting documents to interactive document applications do not adjust the page layout to account for variations in the resolution and screen orientation amongst different platforms. As a result, users of interactive document applications developed using existing tools may have to scroll back and forth to read a single page of the document, which is undesirable.

BRIEF DESCRIPTION OF THE DRAWINGS

FIG. 3 provides a non-limiting example of JAVASCRIPT® pseudo code that may enable real time accurate zoom in/out of a host frame (iframe) in various web browsers.

DETAILED DESCRIPTION

Figure 1:
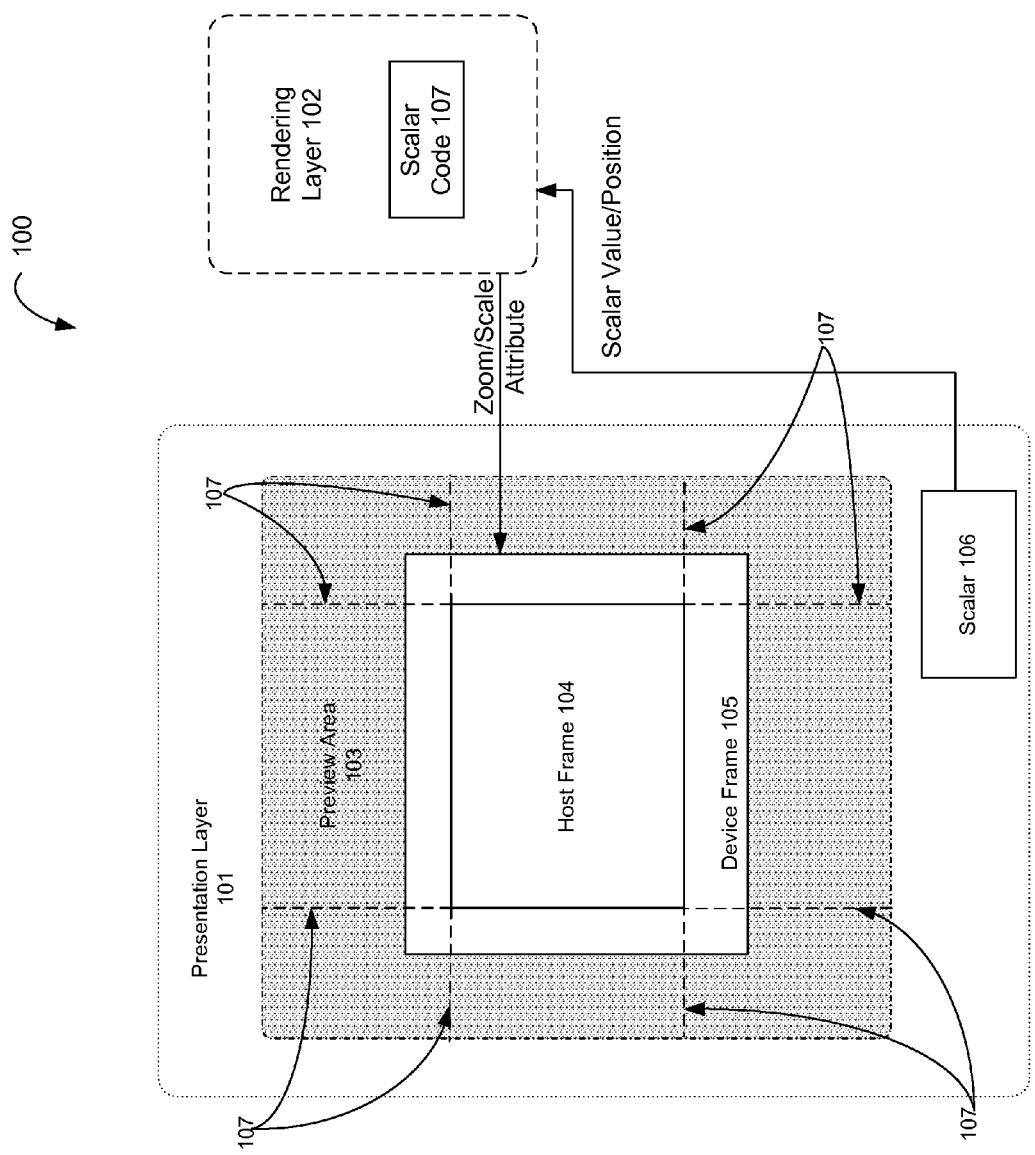
FIG. 1 provides a block diagram of the software components of a device simulator in accordance with non-limiting embodiments of the present disclosure.

One aspect of the present disclosure relates to systems and methods for accurately simulating the display of a target device. Accordingly, described herein are systems that include a processor and a memory having device simulator instructions stored thereon. When executed, the device simulator instructions may cause the processor to perform a variety of functions. For example, the device simulator instructions may cause the processor to generate a user interface within a web browser, wherein the user interface includes at least one host frame and at least one scalar. In some embodiments, a simulation of a target device may run in the host frame, wherein the target device includes at least one display.

The device simulator instructions when executed may further operate to cause the processor to convert a position of said scalar into a zoom ratio, and apply that zoom ratio to the host frame. In some non-limiting embodiments, the at least one first position of the scalar may correlate to a zoom ratio that enables inch to inch mapping between the at least one host frame and the display of the target device. In further non-limiting embodiments, at least one second position of the scalar may correlate to a zoom ratio that enables pixel to pixel mapping of the at least one host frame and the display of the target device.

Also described herein are methods for simulating a target device. The methods may include, for example, generating a simulation of a target device in a web browser executed by a browser and altering a size of the simulation based on a zoom ratio determined from a position of a scalar. In some non-limiting embodiments of the methods described herein, at least one first position of the scalar correlates to a zoom ratio that enables inch to inch mapping between said simulation and a display of said target device. In further non-limiting embodiments of the methods described herein, at least one second position of the scalar correlates to a zoom ratio that enables pixel to pixel mapping of said at least one host frame and a display of said target device.

In some embodiments, the methods described herein include displaying a user interface within a web browser executed by a processor. The user interface may include a presentation layer and a rendering layer. The presentation layer may include HTML code, and the rendering layer may include JAVASCRIPT® code. In some embodiments, the methods include executing a simulation of a target device within the presentation layer, wherein the target device includes at least one display. The methods may further include detecting a position of a scalar with said rendering layer, converting the position of the scalar to a zoom ratio with the rendering layer, and applying the zoom ratio to the simulation. In some non-limiting embodiments, at least one first position of the scalar correlates to a zoom ratio that enables inch to inch mapping between said simulation and the at least one display of the target device. In further non-limiting embodiments, at least one second position of the scalar correlates to a zoom ratio that enables pixel to pixel mapping of the at least one host frame and the at least one display of the target device.

One aspect of the present disclosure relates to systems and methods for implementing accurate inch to inch mapping in a browser hosted simulation of a target device such as, for example, a mobile phone. In some embodiments, the systems and methods of the present disclosure enable accurate inch to inch mapping between a target device and a browser hosted simulation of the target device, while also providing a straightforward mechanism to switch to accurate pixel to pixel mapping between the simulation and the target device.

Accordingly, described herein are device simulators running as a web application on a processor of a computing device. Generally, the device simulators described herein cause a user interface (UI) to be displayed in a web browser running on the computing device. The UI includes at least one device simulator preview area (also referred to herein as a "host frame") that is configured to simulate the display of a target device, such as, for example, a mobile phone, tablet pc, laptop computer, etc. An interactive document web application such as, for example, an electronic book may be run and displayed within the at least one host frame. In this way, the device simulators of the present disclosure can enable a user (e.g., a software developer) to visualize the operation and appearance of an interactive document web application in an environment simulating the display of a target device.

In addition to the basic elements and functions described above, the device simulators described herein may further include at least one device frame adjacent or otherwise in proximity to the at least one host frame. Such device frames may display images, such as, for example, images of the bezel of a target device. In such instances, device frames may be distributed about a host frame, thereby enhancing the simulated operation and appearance of a web application executed within the host frame.

The device simulators described herein may further include a mechanism for adjusting the attributes of the at least one host frame. For example, the UI of the device simulators described herein may include elements and underlying code that permit the selection of the target device type, resolution, and orientation. For example, the device simulators described herein may include source files containing data regarding a plurality of target devices and form factors, such as, for example, mobile phones, tablet PCs, smart phones and laptops. Upon selection of a particular device or attribute (e.g., resolution and/or orientation), the device simulators of the present disclosure may adjust relevant properties of the host frame and re-render an interactive document web application running in the host frame using the adjusted attributes.

For example, if a user selects a different resolution through the UI, the device simulators described herein may operate to adjust the resolution of the host frame, and re-render the host frame (and web application running therein) and/or device frame(s) with the newly selected resolution. Similarly, if the device type is changed through the UI, the device simulators described herein may load data relevant to the selected device (e.g., bezel imagery, resolution, orientation, etc), and re-render the host frame and/or device frame(s) with the properties associated with the selected device.

The UI may further include a scalar that, in combination with scalar code (described later), enables a user to alter the size of the at least one host frame and/or the device frame(s). For example, a position of the scalar may be converted by scalar code to a zoom ratio, which may be applied to the zoom attribute of the at least one host frame and/or device frame(s). As will be described in detail later, this functionality can allow accurate inch-to-inch mapping between the simulated display in the at least one host frame and the display of a target device such as, for example, a mobile phone, tablet PC, etc. And in some embodiments, this functionality can provide an efficient mechanism for transitioning between accurate inch to inch mapping and pixel to pixel mapping between the host frame and the display of a target device.

For the purpose of the present disclosure, the term "position" when used in the context of a scalar, refers to one or both of the actual position of the scalar (e.g., relative to another portion of the scalar), and a value attributable to the position of the scalar. For example, if the scalar is a slider having an arm that may traverse left to right over a range of values (e.g., 0 to 100), the "position" of the slider may refer to the relative position of the slider arm, and/or the value attributable to the slider (e.g., 0, 25, 50, 100, etc) at that position.

FIG. 1 provides a block diagram of a non-limiting example of software components of a device simulator in accordance with the present disclosure. As explained previously, the device simulator may be executed within a web browser running on a processor of a development system, such as, for example, a desktop PC.

As shown in FIG. 1, device simulator 100 includes presentation layer 101 and rendering layer 102. Presentation layer 101 (also referred to herein as a "view" in the context of a model, view, control architecture) includes underlying code that generally functions to draw a user interface in a web browser running on a processor of a development system. In the non-limiting example shown in FIG. 1, presentation layer 101 draws preview area 103, host frame 104, device frame(s)

105, and scalar 106. The precise operation of presentation layer 101 is described later, in connection with the production of a UI for a web application development tool that utilizes the device simulators described herein to assist in the production of interactive document web applications. For the sake of the current discussion, it should be noted that presentation layer 101 may be coded using HTML, and may include various plugins consistent with the understanding of one of ordinary skill in the art. For example, and as will be described in detail below, presentation layer 101 may include an index.html file (or other similar file) that includes references to third party plugin applications and databases, such as, for example, the jQuery JAVASCRIPT® slider plugin and associated databases.

While FIG. 1 illustrates preview area 103 as being significantly larger than host frame 104, it should be understood that preview area 103 may be any size. In some embodiments, preview area 103 is sized such that it approximates at least one dimension of host frame 104.

Preview area 103 may be subdivided (e.g., using HTML) into a plurality columns and rows, thus defining separate regions, or frames. This concept is illustrated in FIG. 1 by hashed lines 107, which illustrate preview area 103 as divided into three rows and three columns, thereby dividing preview area 103 into eight regions (e.g., eight device frame(s) 105) surrounding host frame 104. Consistent with the foregoing discussion, each region (frame) of preview area 103 (including device frame(s) 105) may be independently coded so as to display images, such as, for example, images of the bezel of a target device. This concept is illustrated later in FIG. 8, which provides a non-limiting example of a user interface wherein one or more device frame(s) display an image of a bezel of a target device.

While FIG. 1 illustrates the division of preview area into eight regions that surround a single host frame 104, it should be understood that preview area 103 may be divided into any number of regions and may contain more than one host frame. Indeed, device simulators having a preview area containing 1, 2, 3, 4, 5 or more host frames are envisioned by the present disclosure. By way of example, preview area 103 may be divided into six columns and three rows, thereby enabling the display of two host frames that are each surrounded by eight regions (including eight device frames 105). In this way, multiple simulations of target devices may be rendered at the same time.

Preview area 103 (including host frame 104) may be coded using HTML, variants thereof, and/or other suitable code. In instances where preview area 103 is coded using HTML, host frame 105 may be defined, for example, using the <iframe> HTML tag.

Scalar 106 is a user interface object that has a range of positions that may be changed by a user. In some embodiments, scalar 106 is presented in the form of a slider, a wheel, a pair of zoom in/out buttons, a dropdown list, and/or a series of radio buttons. As a non-limiting example of a suitable scalar that may be used in accordance with the present disclosure, mention is made of the jQuery UI slider library and/or plugin, the implementation of which is described later.

Rendering layer 102 operates to apply device model data and other properties to host frame 104, to render customization panels (later described) within the web browser, and to render a web application running in host frame 104 with the appropriate attributes of a target device and/or user selected properties. Rendering layer 102 may provide this functionality, for example, by making calls to at least one source file containing attributes associated with the display of a target device. Such source files may include information (e.g., device type, orientation, resolution, etc.) for one or a plurality of target devices. Rendering layer 102 can apply the attributes of the target display to the relevant attributes of host frame 104. As a result, web applications running in host frame 104 of device simulator 100 may be displayed within the web browser of a development system with the appropriate attributes of the target device.

Rendering layer 102 may also include scalar code 107 that monitors the position of scalar 106. Based on the position of scalar 106, scalar code 107 may determine a zoom ratio or scale, depending on the browser in which device simulator 100 is executed. For example, scalar code may convert the position of scalar 106 to a scale ratio for use in the FIREFOX® web browser, or a zoom ratio for use in the MICROSOFT® INTERNET EXPLORER®. For conciseness and clarity, the result of this conversion is referred to herein as a "zoom ratio."

Scalar code 107 may apply the determined zoom ratio to preview area 103, host frame 104, device frame(s) 105, and combinations thereof, and re-render the preview area 103 (including host frame 104 and device frame(s) 105) with the determined zoom ratio.

Scalar code 107 may also include an event handler that applies a determined zoom ratio to preview area 103 in response to a scalar event. For example, scalar code 107 may apply a determined zoom ratio to preview area 103 (or components thereof) when the position of scalar 106 starts to change ("start"), as the position of scalar 106 changes ("movement" or "slide"), when the position of scalar 106 stops changing ("stop"), or a combination thereof. In some embodiments, scalar code 107 applies determined zoom ratio to preview area 103 (including device simulation preview area 104 and frame(s) 105, if present) as the position of scalar 106 changes. In such instances, scalar code 107 may cause rendering layer 100 to update the zoom ratio of preview area 103, host frame 104, device frame(s) 105 or a combination thereof, and re-render such area(s) using the determined zoom ratio in real time.

By appropriate adjustment of scalar 106, the size of preview area 103, host frame 104, device frame (105), or a combination thereof may be adjusted so as to provide accurate inch to inch mapping of the simulated display of a target device to the actual target device. This may be accomplished, for example, by adjusting scalar 106 such that device simulator 100 renders preview area 103 (and in particular host frame 104) on the display of a development system such that the size of preview area 103 (and in particular host from 104) approximates the physical size of a target device. In this way, the device simulators can provide a what you see is what you get (WYSWYG) environment. As a result, a web application can appear the same way in the device simulator as it will on a target device.

Figure 2:
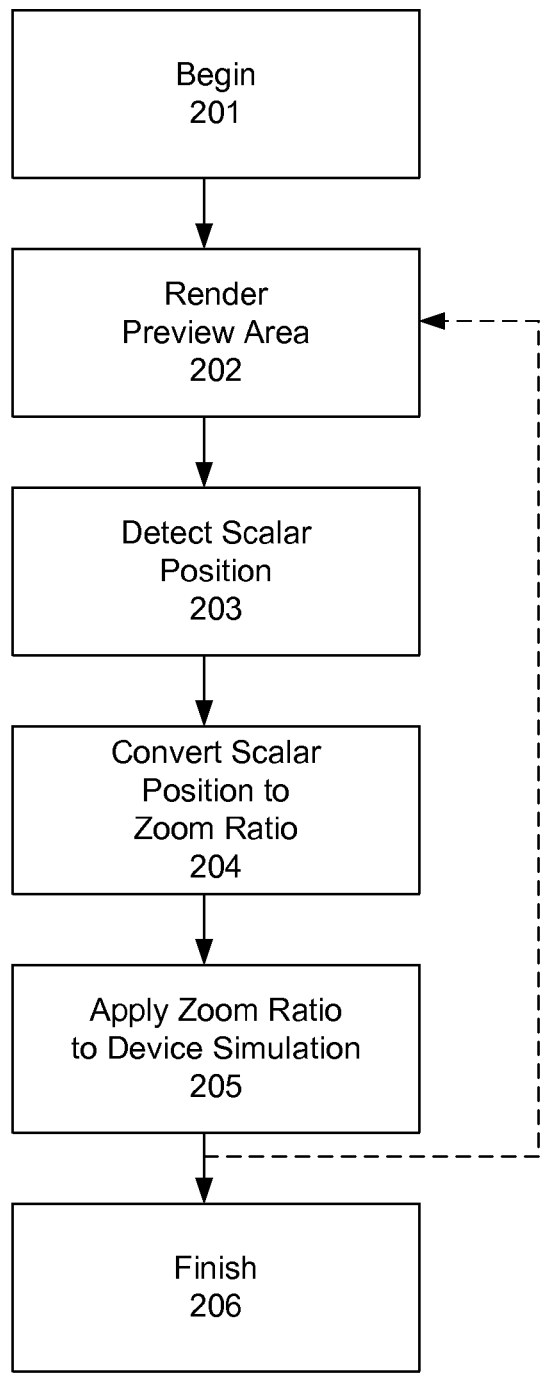
FIG. 2 is a flow diagram of a non-limiting method of adjusting the zoom of the simulated display of a target device in real time, as rendered by a device simulator in accordance with a non-limiting embodiment of the present disclosure.

FIG. 2 provides a flow diagram of a non-limiting method of adjusting the zoom of the simulated display of a target device in real time, as rendered by a device simulator in accordance with the present disclosure. In begin step 201, device simulator 100 may render a web application in host frame 104 of preview area 103 using properties consistent with a default target display. Alternatively device simulator 100 may await the selection of a target device before rendering web application in all or a portion of preview area 103, including host frame 104 and device frame(s) 105. Regardless of the operations conducted in begin step 201, device simulator 100 renders preview area 103 in render preview area step 202.

After rendering preview area 103, scalar code 107 monitors the position of scalar 106 in detect scalar position step 203. The position of scalar 106 may then be converted to a zoom ratio in convert scalar position to zoom ratio step 204. Device simulator 100 may then apply the determined zoom ratio to the preview area in apply zoom ratio to device simulation step 205. Steps 202-205 may be repeated as scalar 106 is adjusted. Using this method, preview area 103 (including host frame 104 and/or device frame(s) 105) may be updated, thereby allowing a user to visualize changes to the zoom ratio of preview area 103 in real time.

In some embodiments, the device simulators described herein are capable of producing a simulated display of a target device with a size that differs from the physical size of a display of a target device by about 5% or less, about 2% or less, or even about 1% or less. In some embodiments, the device simulators described herein can produce a simulated display of a target device with a size that equals the physical size of the display of a target device.

To effectuate inch-to-inch mapping, scalar 106 may be manually adjusted until a comparison of the simulated display rendered by device simulator 100 approximates the physical size of a target device. This may be accomplished, for example, by rendering the simulated display on a monitor of a development system, holding the target device up to the host system, and visually comparing the size of the simulated display to the physical size of the target device while adjusting the scalar. Alternatively, this comparison may be made automatically, e.g., by a program coded to compare the attributes of the simulated display to the pixels (dots) per inch (PPI) of the development display. For example, such a program could make calls to a database containing PPI information for a plurality of development displays, and compare that PPI information to relevant attributes of the simulated display, and in particular the host frame.

Scalar 106 may also be configured such that a selected position correlates to a zoom ratio for device simulation preview area 103, host frame 104, device frame(s) 105 or a combination thereof that is/are pixel-to-pixel mapped with the display of a target device. For example, a selected position of scalar 106 may correlate to a 100% zoom ratio for device simulation preview area 103, host frame 104, device frame(s) 105. In some non-limiting embodiments, the number of pixels within the preview area is greater than or equal to the number of pixels of the display of a target device. That is, the resolution of the preview area (and in particular a host frame) is preferably the same as or greater than the resolution of the display of a target device. In such instances a zoom ratio determined from the scalar may provide a simulated display that is pixel-to-pixel mapped with the display of a target device.

In some instances, the resolution of the preview area may be set lower than the resolution of the display of a target device. In such instances, the simulated display running in the preview area (and in particular host frame 104) may correlate to a portion of display of a target device. Nonetheless, using the scalar described herein, a zoom ratio may be determined that results in pixel-to-pixel mapping between the simulated display and the corresponding portion of the display of the target device.

As a non-limiting example of a scalar that may be used in accordance with the present disclosure, mention is made of the sliders that are enabled by the jQuery UI slider plugin and JAVASCRIPT® library (hereafter, "jQuery plugin"). The jQuery plugin provides numerous slider options, including various handles and ranges that may be selected by a developer. The handles and ranges may be selected by a user, e.g., with a mouse or keyboard.

To illustrate a non-limiting use of the jQuery UI slider plugin, reference is made to FIG. 3. In general, FIG. 3 provides exemplary JAVASCRIPT® pseudocode that enables real time accurate zoom in/out of a host frame (iframe) in various web browsers such as, for example, INTERNET EXPLORER®, FIREFOX®, and CHROME®.

In the non-limiting example shown in FIG. 3, the jQuery library may be included by adding the following lines to an HTML document defining presentation layer 101 (e.g., in index.html):

<script type="text/javascript" src=" . . . /common/js/jquery-1.5.1.min.js"></script>; and
<script type="text/javascript" src=" . . . /common/js/jquery-ui-.8.11.custom.min.js"></script>.

Then, in the body section of the HTMl document, a placeholder for the slider may be provided using a "<div>," e.g.:
<div class="slide" id="slider"<>/div>.

The jQuery library can then be instructed to display a slider at the appropriate placeholder, with a range having a maximum value, a minimum value, and a default value using:
$("#slider").slider({range: "max", value: 70, min: 40, max, 100.

Of course, different types of sliders and sliders having a different range may also be used.

An event handler for the slider may be specified at the end of the previous line. In the non-limiting example in FIG. 3, the event handler is defined by:
slide: function(event, ui) {
which specifies that the event handler will pick up every movement of the slider and update the preview area, thereby redrawing the preview area (including the host frame) in real time in response to every movement of the slider. As noted above, however, event handlers that redraw the preview area in response to other events (e.g., start and/or stop events) may also be specified.

The remainder of the exemplary pseudocode in FIG. 3 specifies the conversion of the slider position to a zoom ratio, and the application of that zoom ratio in various web browsers.

As noted in the background, current web application development tools do not provide a convenient way for application developers to convert electronic documents such as, for example, e-books into interactive document applications for multiple OSes and/or form factors at the same time. Rather, existing tools typically require application developers to convert electronic documents into such interactive document applications using different tools for different OSes. Such a process is time consuming, and can result in an inconsistent experience for users of the produced interactive document applications. Moreover, existing tools often do not account for differences in resolution, screen orientation, and other factors that impact the reading experience across different platforms and operating systems.

The present disclosure may address one or more of these issues by providing integrated development methods and web application development tools that utilize the device simulators described herein. For example, the web application development tools and methods of the present disclosure may provide a mechanism to quickly convert electronic documents such as, for example, e-books to interactive document web applications for one or more OSes and form factors. Moreover, the tools and methods described herein may be capable of adjusting various elements of the generated application, so as to take into account differences in screen resolution, orientation, form factor, etc. amongst differing target devices.

Accordingly, another aspect of the present disclosure relates to web application development tools. In some embodiments, the web application development tools described herein run in a web browser executed on a processor of a development system, such as, for example, a desktop or laptop computer. The web application development tools generally include a web based user interface and a conversion service. In some embodiments, the web application development tools further include a compiler service. The function and exemplary configuration of each of these components is discussed in detail below.

Figure 4:
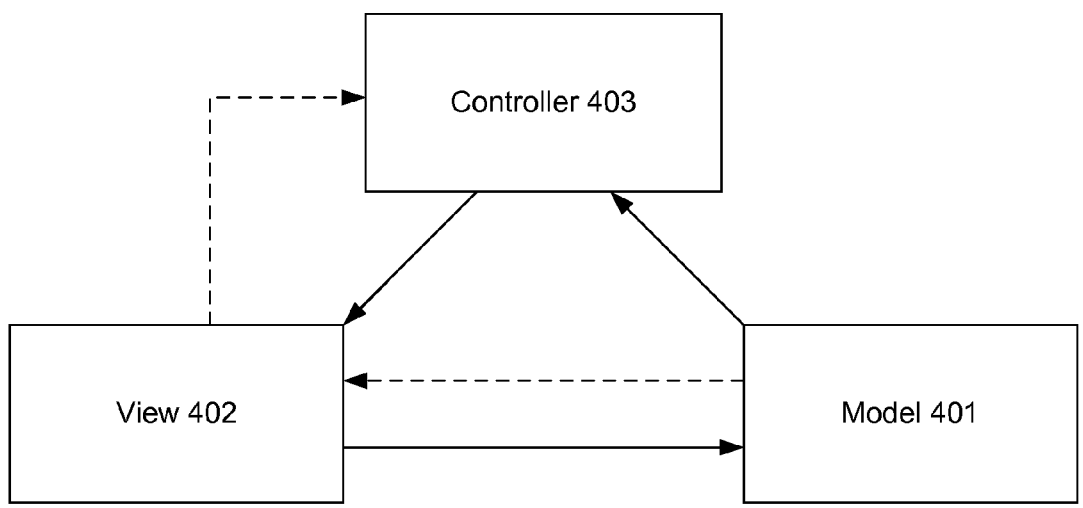
FIG. 4 is an exemplary block diagram of a model, view, control (MVC) architectural pattern upon which one or more aspects of the web application development tools of the present disclosure may be based.

In this regard, reference is made to FIG. 4, which provides an exemplary block diagram of a model, view, control (MVC) architectural pattern upon which one or more aspects of the web application development tools of the present disclosure may be based. In the MVC pattern, model 401 can manage the behavior and data of the application domain, respond to requests for information about its state (e.g., from the view), and/or respond to instructions to change state (e.g., from the controller). In an event-driven system, model 401 may notify observers (e.g., views) when information about its state changes, so that the observers can react.

View 402 is generally configured to render the model into a form suitable for interaction, e.g., a user interface element. It should be understood that multiple views may exist for a single model. In such cases, each view may serve the same or different purpose as another view. View 402 may have 1:1 correspondence with a display surface (e.g., a monitor), and may be configured such that it knows how to render to the display surface.

Controller 403 is generally configured to receive inputs (e.g., from a user) and initiate a response to such inputs by making calls on model objects or other resources. For example, controller 403 may accept an input from a user, and instruct the model and view to perform actions based on that input.

As noted above, the tools and methods of the present disclosure may utilize a UI and a conversion service to convert electronic documents such as, for example, e-books into interactive document web applications. As will be described in detail below, the UI may be configured to provide a convenient mechanism for the provision of source files, e.g., by providing an upload or import utility that permits source files to be loaded into the web application development tools of the present disclosure. Once loaded, the conversion service may convert the source file into an interactive document web application (e.g., in HTML/JAVASCRIPT® language), which may be run and edited in a device simulator. Optionally, the web based authoring tools may utilize a conversion service to package the interactive document web application into packages and application installers suitable for use with a wide variety of OSes and form factors.

For the purpose of clarity and brevity, the present disclosure focuses on conversion of electronic documents that are stored in the epub file format into interactive document web applications. It should be understood, however, that electronic documents that are stored in any suitable file format may be used. For example, documents stored in PDF format, doc format, docx format, HTML format, TXT format, MOBI format etc. may be used.

Figure 5:
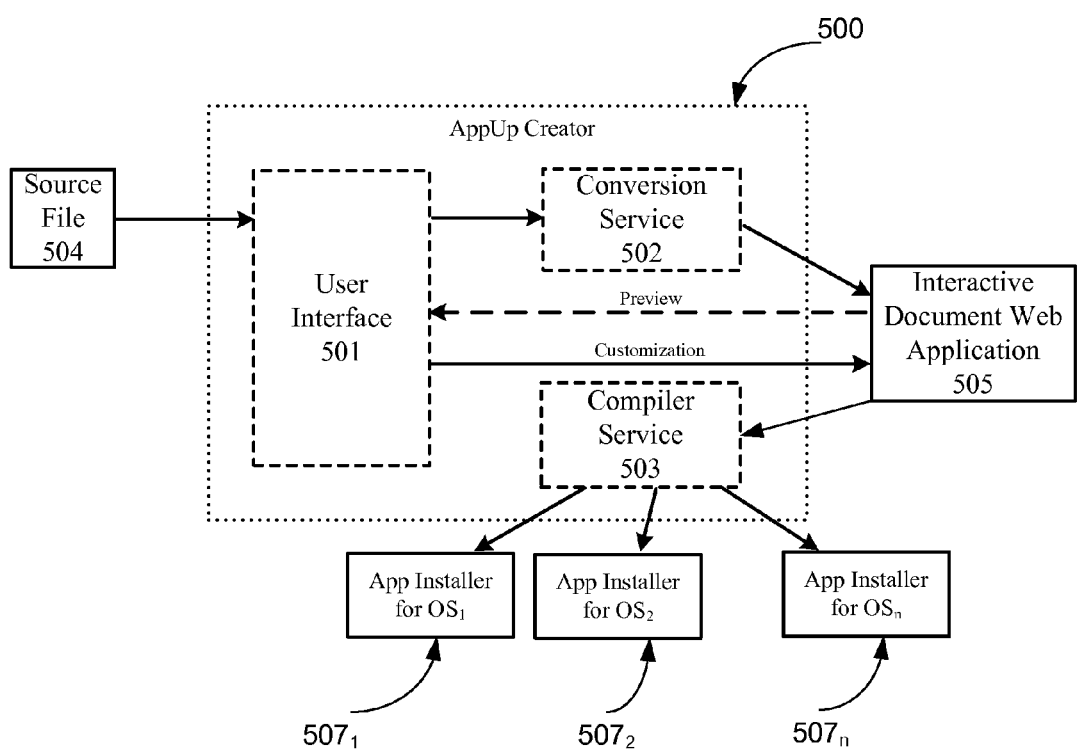
FIG. 5 is a top level architecture and work flow diagram for a web application development tool in accordance with non-limiting embodiments of the present disclosure.

FIG. 5 provides a top level architecture and work flow diagram of an exemplary web application development tool in accordance with non-limiting embodiments of the present disclosure. As shown, web application development tool 500 includes user interface 501, conversion service 502, and compiler service 503. In operation, a source file 504 such as, for example, an e-book is loaded into web application development tool 500, e.g., via user interface 501. Once loaded, conversion service 502 converts source file 504 into interactive document web application 505. A preview of interactive document web application 505 is generated within a device simulator (not shown) running within user interface 501.

As will be described later, interactive document web application 505 may include style code (e.g., cascading style sheets) and dynamic code (e.g., JAVASCRIPT®). Generally, the style code permits customization of the user interface of interactive document web application 501. In contrast, the dynamic code generally operates to dynamically adjust various elements of interactive document web application 501 (e.g., its page layout, orientation etc.) in response to inputs made through user interface 501 of web application development tool 500.

With this in mind, user interface 501 may include customization code, simulator control code, and project bar code, any of which may be used to customize the interactive document web application 505. For example, inputs made through the UI may be used to alter the user interface of interactive document application 505, and/or its resolution, layout, orientation, font etc. Moreover, user interface 501 may include elements that function to insert plugins (e.g., social plugins) into interactive document web application 501. In response to such inputs, interactive document web application 505 and/or its preview may be updated.

Once customization of interactive document web application 505 is complete, compiler service 503 can operate to package the resulting customized interactive document web application into native applications suitable for installation on a number of OSes. This is illustrated in the exemplary top level architectural and work flow diagram of FIG. 5, wherein compiler service 503 packages interactive electronic document web application 505 into application installers 507$_1$, 507$_2$, 507$_n$ for OS1, OS2, OSn, respectively. Compiler service 505 may package an interactive document web application into native applications using a web-kit or another suitable mechanism.

The electronic document web applications generated by the conversion service include source files and/or underlying code that allow the application to be dynamically edited in a device simulator. For example, the electronic document web applications may include dynamic code such as, for example, a JAVASCRIPT® engine that is configured to dynamically generate HTML pages from other source files.

In addition, the interactive document web applications may include layout code, such as, for example, one or more HTML pages that define the layout of the user interface of the electronic document web application. Moreover, the electronic document web applications may include style code (e.g., cascading style sheets) that defines the appearance (e.g., color scheme, button shape, icons, etc.) of each component of the user interface of the interactive document web application. The interactive document web applications may also include TOC code (e.g., one or more HTML files) that provides a table of contents (TOC) and optionally serves as an entrance to the interactive document web application. Finally, the interactive document web application may include chapter code (e.g., one or more html files), which contain the substance of each chapter of the electronic document contained in a source file described above.

Figure 6:
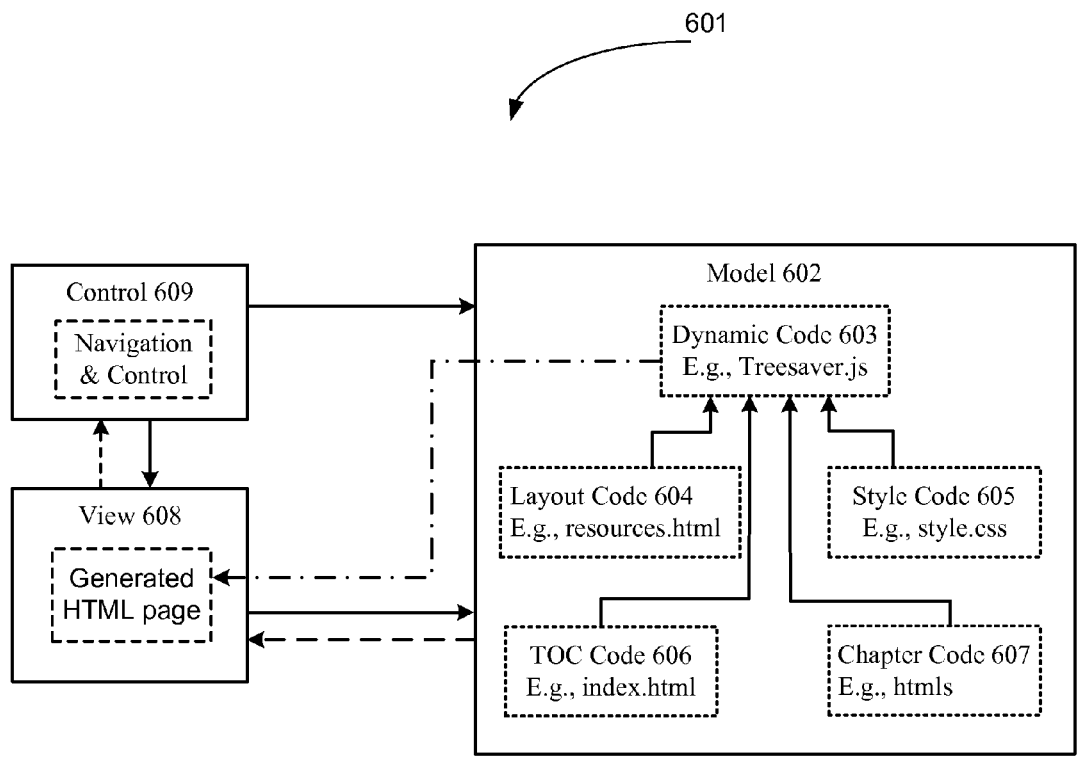
FIG. 6 is an architectural diagram of an interactive document web application in accordance with non-limiting embodiments of the present disclosure.

FIG. 6 provides an exemplary architectural diagram of an interactive document web application in accordance with the present disclosure. As shown, interactive document web application 601 is coded using the MVC architecture described above. Model 602 includes dynamic code 603 (e.g., the JAVASCRIPT® Engine treesaver.js), which dynamically generates HTML pages from source files such as, for example, layout code 604 (e.g., resources.html), style code

605 (e.g., style.css), TOC code 606 (e.g. index.html), and chapter code 607 (e.g., HTML files).

One or more of dynamic code 603 (e.g., treesaver.js), layout code 604, and/or style code 605 may be coded such that they load before a host browser loads TOC code 606 (e.g., index.html) and/or chapter code 607. This can enable dynamic code 603 to generate HTML pages in the host browser using the style (e.g., style sheets) specified in style code 605 (e.g., style.css), and a navigation layout specified in layout code 604 (e.g., resources.html). The HTML pages generated by dynamic code 603 may be rendered in the view 608 (e.g., in a host browser), where they may be viewed by a user.

Dynamic code 603 may also be responsive to inputs made through control 609, which may be embodied in the user interface of the web application development tools described herein. Thus, for example, control 609 may function to alter various aspects of model 602, such as, for example, to move to previous/next chapter, to previous/next page, or to rotate the screen. Dynamic code 603 may generate HTML pages in response to such inputs, thereby updating model 602 to include the alterations input through control 609. View 608 may then be updated with the HTML pages generated in response to the input, allowing a user to view the alterations to the interactive document web application.

Of note is the fact that in the non-limiting example shown in FIG. 6, the interactive document web application is produced using HTML and JAVASCRIPT®. As a result, the interactive document web application may be platform independent, because a wide variety of OSes and hardware are capable of executing HTML and JAVASCRIPT®. Indeed, it is expected that as long as the OS and hardware of a target device support web browsing, the target device should be able to execute the interactive document web applications of the present disclosure without difficulty.

Although the interactive document web applications described herein may be platform and/or OS independent, it may be necessary to package such applications into an appropriate installer before they can be installed on a target operating system. With this in mind, different OSes may require different types of installers. For example, MICROSOFT® WINDOWS® may require the use of an installer in the MSI format, whereas another OS may require the use of an installer in another format. In some embodiments, the web application development tools of the present disclosure can address this issue through the use of an optional compiler service.

Generally, the compiler service of the present disclosure operates to compile an interactive document web application into a final native application for a target OS, and to generate an appropriate installer for the target OS. In instances where the interactive document web application is to be used on multiple OSes, the compiler service may be configured to simultaneously or separately generate native applications and installers for each target OS.

The compiler services disclosed herein may include one or more of pre-processing code (e.g., ebulwagsvc.php in FIG. 9) and encapsulation code. The pre-processing code may perform a variety of functions. For example, the pre-processing code may add icons (e.g., user uploaded icons) to the interactive electronic document web application. Additionally or alternatively, the pre-processing code may compress the interactive electronic document web application into a single file, such as, for example, a .zip file. And in some embodiments, the pre-processing code may upload the compressed file to a distribution server, and present download links to the web based UI once individual native application versions of the interactive document web application are built.

The encapsulation code is a service that functions to compile the interactive document web application into a native application for various OSes and form factors. The encapsulation code may be hosted locally or remotely. For example, the encapsulation code may be a web service hosted computer (e.g., a server) that is remote from a development system running the web application development tools described herein.

Figure 7:
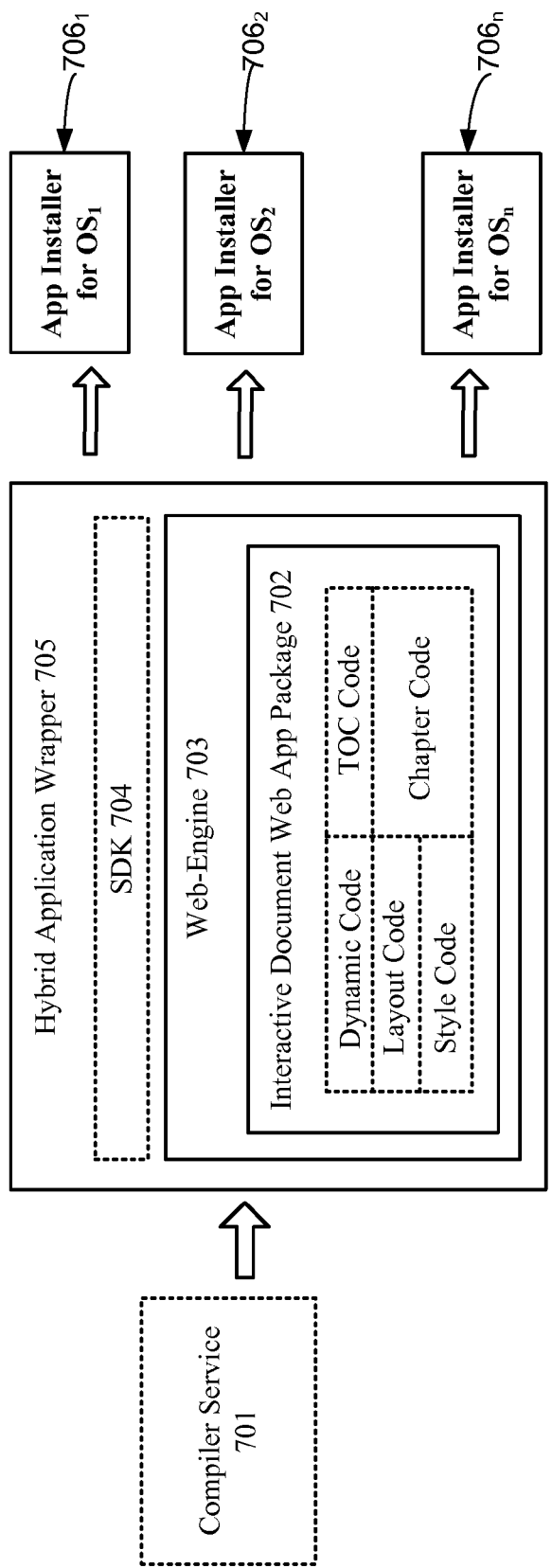
FIG. 7 is an architectural diagram for a native application produced by a compiler service in accordance with non-limiting embodiments of the present disclosure.

FIG. 7 provides a non-limiting example of an architectural diagram for a native application produced by a compiler service in accordance with the present disclosure. As shown, compiler service 701 wraps an interactive document web application into an interactive document web application package 702. In addition, compiler service 701 may add additional layers, such as, for example, web engine 703, software development kit (SDK) 704, and hybrid wrapper 705.

Interactive document web application package 702 may include various components of the interactive document web applications disclosed herein. For example, the interactive document web application package 702 may include dynamic code, layout code, style code, chapter code, and TOC code, as previously described. The interactive document web application package may take the form of a compressed file (e.g., a zip file) containing multiple files discussed above.

Web engine 703 may be an OS-dependent engine that is configured to extract the interactive electronic document web application from interactive electronic document web application package 702. In addition web engine 703 may be configured to parse the underlying code of the interactive document web application (e.g., the layout code (e.g. html), style code (e.g., CSS), and dynamic code (e.g., JAVASCRIPT®)) and render an output to an assigned window (e.g., a window assigned by hybrid wrapper 705). Currently, a web engine must be compiled for each OS. To the extent web engines that are operable across multiple OSes become available, the present disclosure envisions such web engines.

SDK 704 may be an OS-dependent SDK, and may perform a number of different functions. For example, SDK 704 may verify whether a particular user is authorized to use a final native application. In addition, SDK may operate to put the final native application in full screen mode or a windowed mode. Of course, these functions are exemplary only, and SDK 704 may provide other SDK functions as known in the art. In some embodiments of the present disclosure, compiler service 701 compiles an SDK for each target OS.

Hybrid wrapper 705 may be an application that is compiled for a target OS, and may be used to invoke verification and other protocols. For example, hybrid wrapper 705 may invoke SDK 704 to verify if a user is authorized to use the final native application. Upon success, hybrid wrapper 705 may load web engine 703 for a target OS, and pass the location of the interactive document web application package to web engine 703.

Regardless of the methodology, it should be understood that compiler service 701 operates to generate application installers $706_1$, $706_n$ for $OS_1$ and $OS_n$, respectively. This may be accomplished using the exemplary architectural diagram and methodology shown in FIG. 7, or in another manner.

As noted above, the web application development tools of the present disclosure may include a user interface (UI). As will be described in detail below, the UI of the present disclosure may be web based, and can permit a user to edit various aspects of an interactive document web application running in a device simulator. Edits made to the interactive document web application may be rendered in real time, periodically, or at varying intervals. In this way, the UI can permit a user to observe the impact of changes made to an interactive document web application in the context of a simulated display of a target device.

Figure 8:
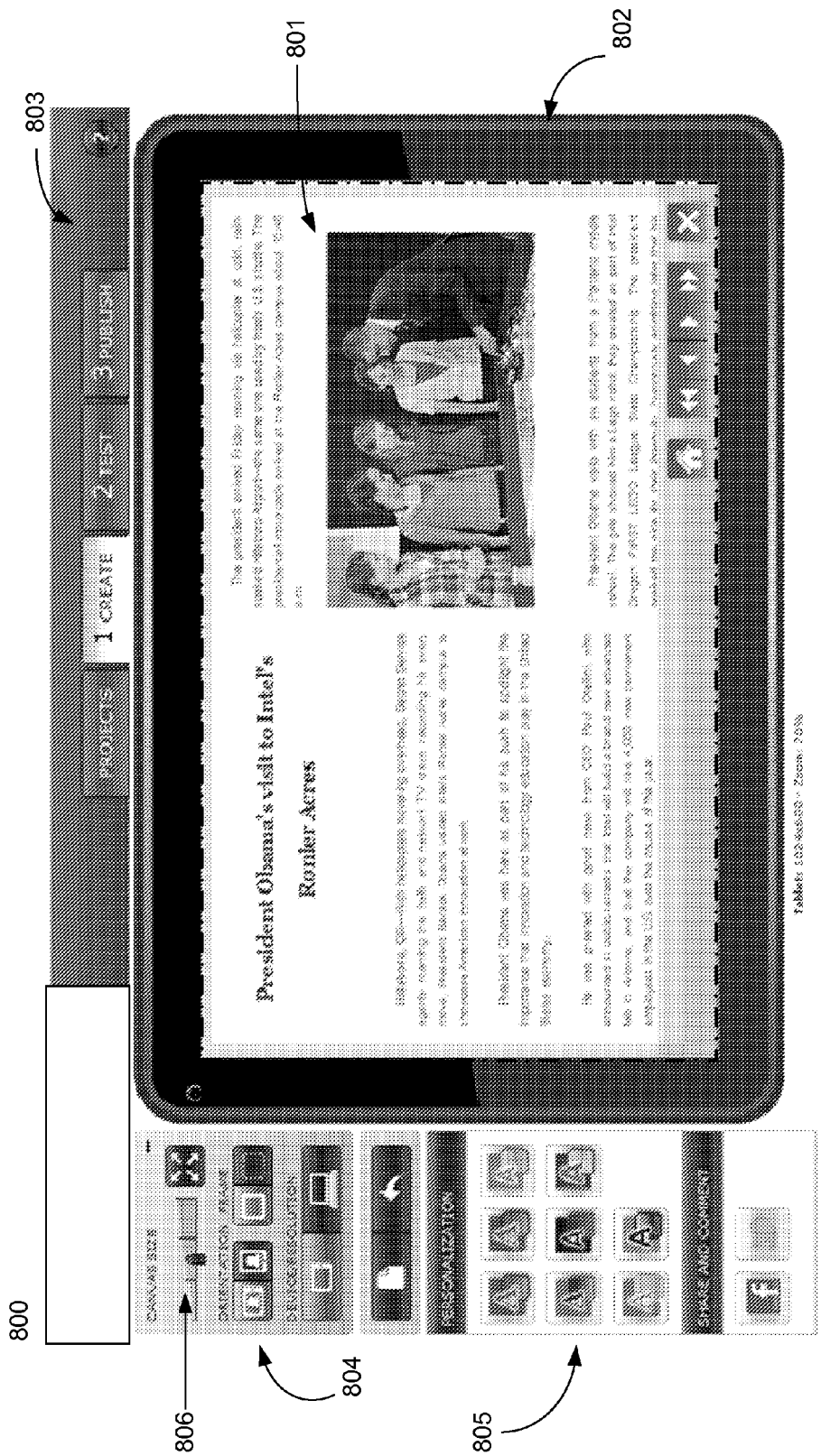
FIG. 8 provides a non-limiting example of a user interface in accordance with the present disclosure.

To this end, reference is made to FIG. 8, which provides a non-limiting example of a UI in accordance with the present disclosure. As shown, UI 800 includes device simulator that includes device simulator preview area 801 and device frame 802. Generally, the device simulator serves as a location in which the interactive document web applications generated by a conversion service may be previewed. Device frame 802 generally correlates to the device frame(s) of the device simulators previously described herein. Thus, device frame 802 may operate to display one or more images, such as, for example, the image of a bezel of a target device (e.g., a mobile phone, a tablet PC, etc.). Device simulator preview area 801 may correlate to the host frame of the device simulators previously described herein. Accordingly, a preview of the interactive document web application may be run within device simulator preview area 801.

As further illustrated in FIG. 8, UI 800 may include other components, such as, for example, project bar 803, simulator settings panel(s) 804, and customization panel(s) 805. Generally, project bar 803 contains elements related to project level operations. For example, project bar 803 may include elements that allow a user to select a project type, to create a new project, to make a test package, and/or to publish a release package of an existing project.

Simulator settings panel 804 generally includes elements related to the operation of a device simulator running within UI 800. For example, simulator settings panel 804 may include a scalar 806 (such as, for example, a slider), which may function to adjust the zoom ratio of device simulator preview area 801 and/or device frame 802. In some embodiments, scalar 806 can enable pixel to pixel and inch to inch mapping of the simulated display generated by the device simulator with the display of a target device, as described previously.

In addition to scalar 806, simulator settings panel 804 may include other customization commands that impact the display of an interactive document web application running in a device simulator executed within UI 800. For example, simulator settings panel may include commands that permit changes to the simulated device type, resolution, orientation (rotation), etc.

Customization panel 805 may include commands that alter the format, style, and layout of an interactive document application. For example, customization panel 805 may include commands that change the user interface of an interactive document web application, the organization of information in the application, the font, etc. In addition, customization panel 805 may include commands that insert plugins at appropriate locations within an interactive document web application. For example, customization panel 805 may include commands that insert links or plugins to social media sites (e.g., www.facebook.com and www.twitter.com) at appropriate locations within an interactive document web application. As will be described later, this may be accomplished using dynamic code that inserts relevant plugin code into the source files of an interactive document web application.

The web based UI of the present disclosure may be designed using an MVC pattern. As a non-limiting illustration of this concept, reference is made to FIG. 9, which provides a non-limiting architectural diagram of a UI 900 in accordance with the present disclosure.

When an e-book is selected as the project type (e.g., through project bar 803), the underlying code of UI 900 may generate an appropriate controller class object 903 (e.g., eBookController.js) to load relevant data and panels for the selected project from other resources, such as, for example, model class object 904 (e.g., eBookmodel.js). In addition, the controller class object 903 may render the relevant customization panels in a web browser.

The underlying code of UI 900 may also generate one or more additional controller class objects to load device simulator data from appropriate resources, and render the device frame of a device simulator running in UI 900. This is shown in the non-limiting example of FIG. 9, wherein deviceHelper.js loads device simulator data from sharedmodel.js (a model resource containing simulator information).

When a source document such as, for example, an epub document is provided (e.g., by uploading, importation, or another means), conversion service 901 (e.g., epub2html.php in FIG. 9) may be used to convert the source file to an interactive document web application 905 that includes layout and style code, as explained above. For example, the epub2html.php service may convert the source file to an interactive document web application that includes HTML and CSS files. Upon completion, controller class object 903 (e.g., eBookController.js) may load the interactive document web application, and render it in a device simulator preview area.

When commands such as, for example, those contained in project bar 803, simulator settings panel(s) 804, and customization panel(s) 805 are invoked (e.g., clicked or dragged and dropped on the device simulator preview area), controller class object 903 (e.g., eBookcontroller.js) may instruct conversion service 901 (e.g., through a service such as, for example, ebupdatesvc.php) to modify the source files of the interactive document web application (e.g., layout code such as, for example, resources.html), style code such as, for example, style.css, etc.) to include the desired changes. In addition, controller class object 903 may instruct conversion service 901 to reload the interactive document web application in the device simulator preview area of view 902. Once edits to interactive document application 905 are complete, compilation service (e.g., ebulgwasvc.php) 906 may compile native installers for multiple OSes.

Figure 9:
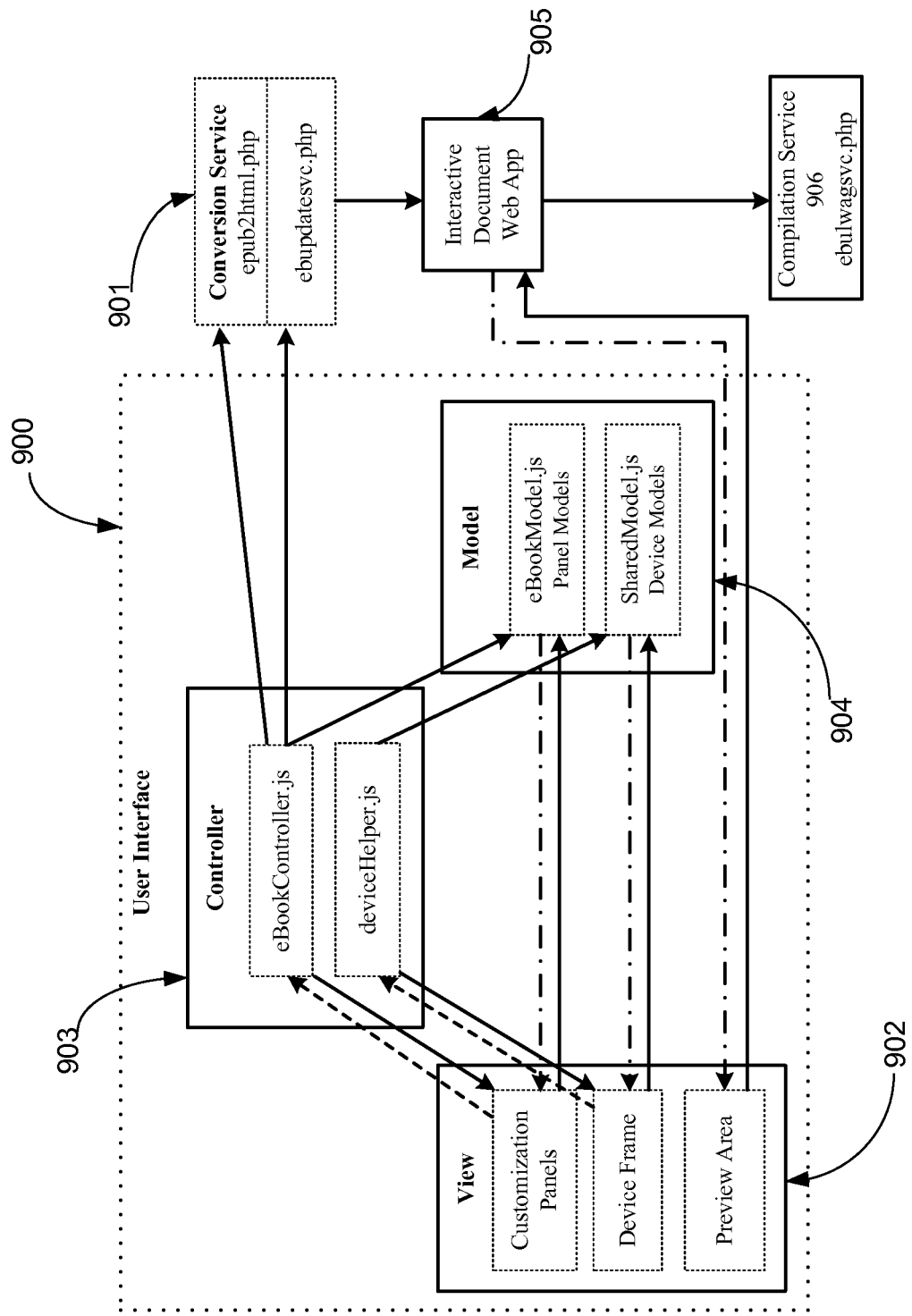
FIG. 9 is an architectural diagram of a web based user interface in accordance with non-limiting embodiments of the present disclosure.

From the above, it should be apparent that the conversion services of non-limiting embodiments of the present disclosure may perform two functions. First, the conversion services described herein may operate to convert electronic documents into interactive document web applications (e.g., epub to webapp). Second, the conversion services described herein may operate to update the source files of an interactive document web application to include any changes made through the UI. As shown in FIG. 9 and briefly described above, these two functions may be performed by respective services, e.g., epub2html.php and ebupdatesvc.php.

With respect to the conversion of electronic documents to interactive web applications, the conversion services described herein (e.g., epub2html.php in FIG. 9) may use a conversion algorithm to extract data from the document source file. Generally, the conversion algorithm includes an e-book parser that extracts the electronic document source file (in epub or another supported format) to retrieve relevant data, and a webapp generator that creates certain source files of the interactive web application. For example, the e-book parser may extract metadata corresponding to the author, title, publisher, chapter listing etc., as well as parse the body text and/or images of the document source file. The webapp generator may create the TOC code (e.g., TOC.html) of the interactive document web application by populating a template file (e.g., a template TOC.html file) with data extracted by the e-book parser, such as, for example, the metadata and chapter listing. In addition, the webapp generator may create chapter code (e.g., individual HTML files) by filling a chapter template (e.g., template chapter html files) with the extracted body text data and images.

With respect to updating the source files of an interactive document web application to include any changes made through the UI, the conversion service (e.g., ebupdates.php in FIG. 9) may perform one or more functions. For example, the conversion service may operate to insert social plugin code at appropriate locations in the layout code (e.g., resources.html) of the interactive document web application. Alternatively or additionally, the conversion service may operate to change the book theme by replacing or updating the style code (e.g. style.css) and/or layout code (e.g., resources.html) with the style and layout code specified in by a selected theme. In such instances, social plugin code may or may not be retained. In some embodiments, social plugin code is retained, despite a change in theme. From this, it should be understood that the conversion service may be used to update any and all of the elements related to the layout and appearance of an interactive document web application, such as, for example, the font, font size, orientation, resolution, etc.

The conversion service may also be configured to provide a reset option. When exercised, the reset option may function to rest the style and layout code of the interactive document web application to the style and layout code specified in a default or preselected theme. In such instances, social plugin code (e.g., html code) may or may not be retained. In some embodiments, social plugin code is removed upon exercise of the reset option.

Figure 10:
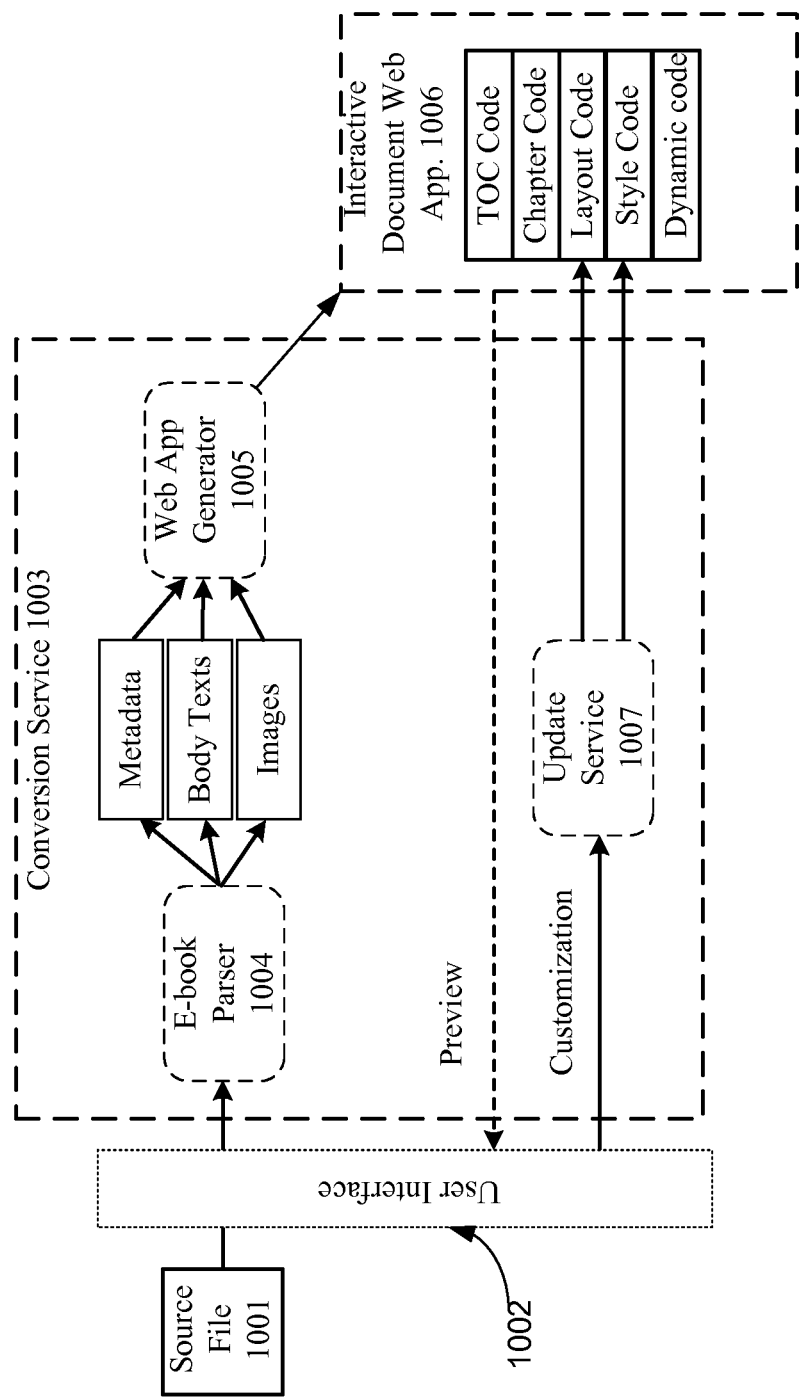
FIG. 10 is an architectural diagram of a conversion service in accordance with non-limiting embodiments of the present disclosure.

FIG. 10 is an exemplary architectural diagram of a conversion service in accordance with the present disclosure. As shown, document source file 1001 may be loaded into the web based authoring tool of the present disclosure through UI 1002 or another means. Once loaded, conversion service 1003 extracts data (e.g., metadata, body text, images, etc.) from document source file 1001 using e-book parser 1004. WebApp generator 1005 applies the extracted information to generate source files for interactive document web application 1006.

A preview of the interactive document web application 1006 may be generated (e.g., using a default theme, layout, etc.) and displayed in device simulator running in UI 1002. Update service 1007 can detect changes made through UI 1002, and instruct the dynamic code (e.g., JAVASCRIPT® code such as, for example, treesaver.js) to update the source files of interactive document web application 1006 accordingly. The preview of interactive document web application 1006 running within UI 1002 may then be refreshed.

For clarity, the present disclosure will now discuss a non-limiting example of the work flow performed by an electronic document to web application conversion algorithm in accordance with the present disclosure. For the sake of illustration, this example focuses on the conversion of a document source file stored in the epub format to an interactive document web application. It should be understood, however, that the same or similar steps could be performed using source document stored in other formats.

In this non-limiting example, the conversion service includes an e-book parser that extracts a source document file in epub format to a temporary directory. As an initial matter, the e-book parser may verify the contents of the extracted file, and then proceed to extract metadata by examining an XML file (e.g. container.xml) extracted from the source document file and stored in the temporary directory. Through this examination, the e-book parser may obtain the full path attribute of the rootfile node, which is the path of the open packaging format (OPF) file that houses an epub's metadata, file manifest, and linear reading order.

Once the path of the OPF file has been determined, the e-book parser may open the OPF file as an extensible markup language (XML) file, locate the metadata node, and make a cloned copy of the metadata node (hereafter, the "cloned metadata node"). The e-book parser may then search for specific nodes within the metadata node to identify information that may be used in the interactive electronic document application. For example, the e-book parser may identify nodes relating to the title (e.g., dc:title) and table of contents (e.g., a spin node). With respect to the table of contents, the e-book parser may examine a spin node for the TOC attribute, and search all child nodes under the manifest node for entries having an id equal to the TOC attribute. In addition, the e-book parser may identify the href attribute value which may correspond to the path name of a navigation control file (NCX file).

The conversion algorithm may generate a table of contents by: iterating all itemref child nodes under the spin node; obtaining their identifying value (e.g., idref); searching all child nodes under the manifest node for entries having an identifier equal to the identifying value; obtaining the href attribute value for such items; and creating a new chapter item in a TOC listing using the href attribute as a full path name.

The e-book parser may open the NCX file as an XML file, and examine it to perform several functions. For example, the e-book parser may locate the docTitle node in the NCX file and obtain its text node value. This value may be used as the title in instances where the dc:title node is missing in the OPF file. In addition, the e-book parser may analyze the NCX file for the docAuthor node, and obtain the text node value. This value can be used as the book author name. Moreover, the e-book parser may update the TOC list by: locating the navMap node in the NCX file; iterating all navPoint child nodes and obtaining their navLabel/text node value. This value may be used as the title of each chapter. The e-book parser may also search the TOC listing described above, and add the navLabel/text node value as the title to any chapter item having the same full path name as the src attribute of the content node. Otherwise, a default descriptor, e.g., "part xx" may be used as the title of a chapter, where xx is the index number in the TOC listing.

As briefly explained above, the e-book parser may extract body text and images from an electronic document source file. The following description provides a non-limiting example of how the e-book parser and webapp generator may use that information to generate source files for an interactive document web application.

In this non-limiting example, the e-book parser may open HTML files specified by each chapter item in the TOC listing described above. A webapp generator may open an output chapter file (in an output directory) for writing, and may prepopulate the output chapter file with the contents of a template file. In some instances, the output chapter file has the same name as the source electronic document file, but with an HTML extension. The e-book parser may also locate the relevant head→title node, and the webapp generator may use the value of that node as the title of the chapter under consideration. If the head→title node is not available, the webapp generator may use another value as the chapter title, such as, for example, the book title.

The web app generator may then output the cloned metadata node to the output chapter file. Using a recursive function (e.g., convertnodelist( )) the e-book parser may iterate all child nodes of a <body> section of an input chapter file, and extract the body text and/or images. The webapp generator may then add the body text and images to the output chapter file.

The recursive function (e.g., convertnodelist( )) may use two arguments, nodeList and parentNode. The nodeList argument is a list of input nodes from which the e-book parser may read. The parentNode argument is a target output node, which is where the output may be inserted by the webapp generator.

The e-book parser may iterate all nodes in the nodeList argument, and perform a variety of actions depending on the node type. For example, if the node type is an XML_TEXT_NODE, the e-book parser may extract body text from the nodeValue, and append that bodyText under a parentnode.

If the node type is an XML_ELEMENT_NODE, the e-book parser may check the nodeName and perform different actions based on the nodeName. For example, if the nodeName is img, the e-book parser may extract the location of the image from the src attribute of the node, and copy the image file from the temporary directory to the output directory. The webapp generator may then create an img node, set the src attribute of the img node to the location in the output directory, and set the width and height attributes of the image to a desired value.

If the nodeName is div, p, span, and/or pre, the webapp generator may perform functions based on the relevant parent node name. For example, if the parent node name is p or span, or if there is no text child node, the webapp generator may call the recursive function (e.g., convertnodelist( )), use all child nodes of the current node as the nodeList, and use the current parentnode as parentNode. Otherwise, the webapp generator may: create a new p node; append it under parentNode; call the recursive function (e.g., convertnodelist( )); use all child nodes of the current node as nodeList; and use the new p node as parentNode.

If the nodeName is table, tr, td, or svg, the webapp generator may call the recursive function (e.g., convertnodelist( )), use all of child nodes of the current node as nodeList, and use the current parentNode as parentNode.

If the nodeName is h1, h2, h3, h4, h5, h6, b, I, big, ol, ul, li, d, dt, dd, em, code, strong, and/or blockquote, the webapp generator may: create a new node with the same name; append it under parentNode; call the recursive function (e.g., convertnodelist( )); use all child nodes of the current node as nodeList, and use the new node as parentNode.

The web app generator may also create the TOC code (e.g., index.html) of an interactive document web application using a TOC template (e.g., TOC.html) and the TOC listing described above. For example, the web app generator may open an output TOC file (e.g., index.html), and prepopulate it with the content of a TOC template file. The TOC template may include node entries for the title (e.g., head→title) and the author (e.g., body→article), which may be populated by the webapp generator with the relevant data extracted by the e-book parser. In some embodiments, the webapp generator populates the body→article node with an h1 node for the book title, and an h4 node for the author. The webapp generator may also iterate all chapter items in the TOC list (discussed above), and create a node (e.g., an h4 node) for each chapter item. The value of each node may then be set to include text corresponding to the chapter title (which may be determined by the e-book parser as described above). A hyperlink associated with the location of each chapter code may also be added under each chapter item node.

Upon completion of the electronic document to web application conversion, the conversion service may return the output file(s) (e.g., index.html) in the temporary folder to the web-based UI for preview rendering.

Figure 11:
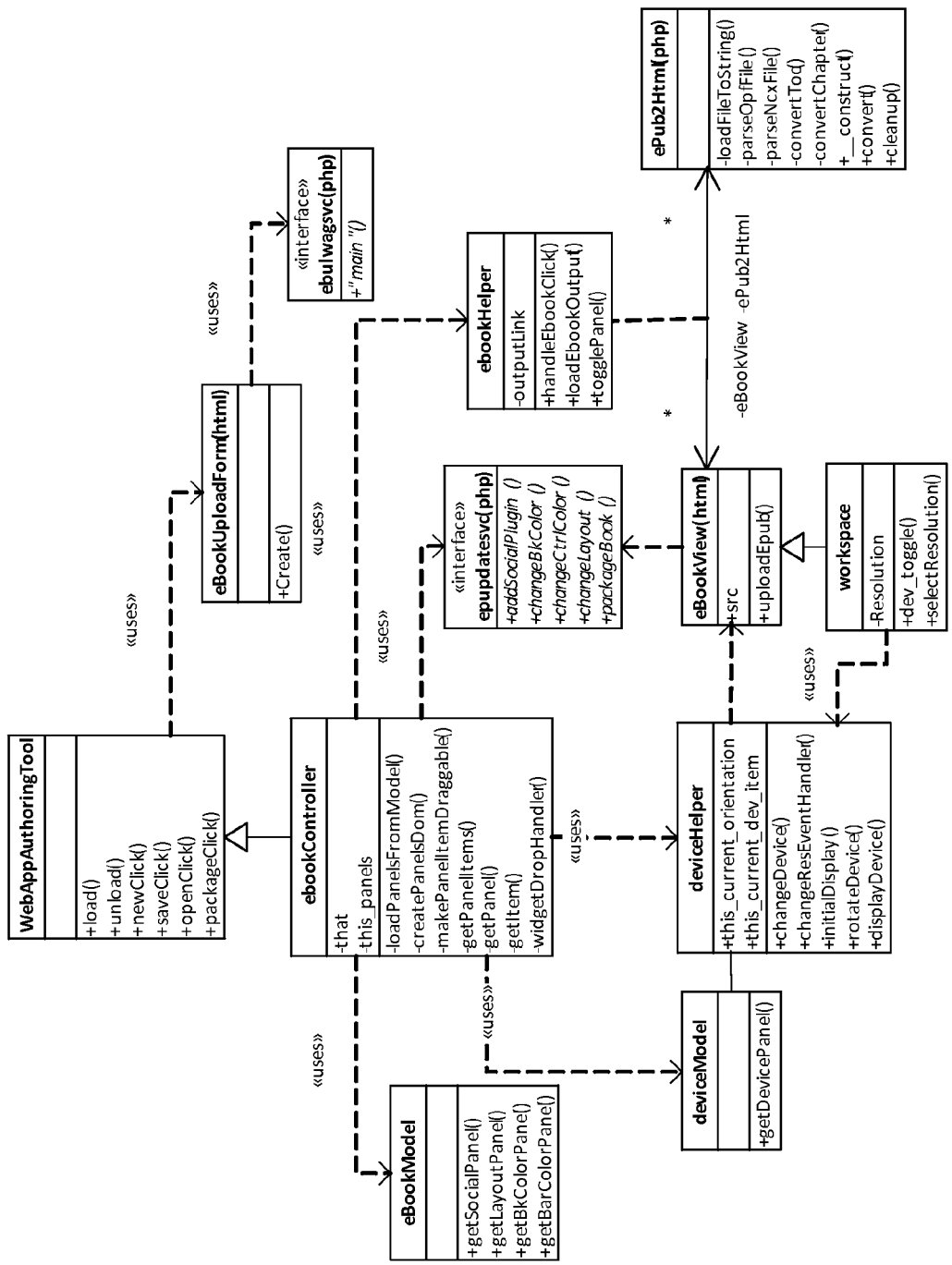
FIG. 11 is a class diagram for a non-limiting example of a web application development tool in accordance with the present disclosure.

FIG. 11 provides a non-limiting example of a class diagram for a user interface of a web application development tool in accordance with the present disclosure. The objects in this non-limiting class diagram may be mapped to the architectural view of FIG. 6 as shown in Table 1:

TABLE 1

| Model/Class/View | Exemplary Object | General Function |
| --- | --- | --- |
| Model | Ebookmodel | Loads model data for customization panels |
| Model | Devicemodel | Loads model data for the device simulator |
| Model | ePub2HTML.php | Converts electronic document source file to source (e.g., html) files for an interactive document web application |
| Model | Epubupdatesvc.php | Modifies source files of the interactive document web application based on inputs made through a UI |
| View | eBookview.html | Renders device frame images and interactive document web application in the device simulator preview area (host frame) of the UI |
| View | Workspace | A div in the layout code (e.g., index.html) that represents the enter Device Simulator, including eBookview.html |
| Control | Webappauthoringtool | The base class of ebookcontroller. May define the virtual application program interface for common functions of all project types (e.g., e-book, web application, video, etc.). May include an event handler for buttons on the project bar of the UI. |
| Control | eBookcontroller | May define the core controller of the web application development tools described herein. Can define the implementation of a base controller (e.g., packageclick), apply panel and device model data to render the panels and device simulator, and can define the event handlers which invoke epubupdatesvc.php |
| Control | deviceHelper | Can apply device model data to render the device frame(s) of the device simulator with at least one of a selected device type, resolution, and orientation (rotation) |
| Control | eBookhelper | May associate the model (e.g., epub2html.php) with the view (e.g., ebookview.html) in accordance with events such as, for example, the upload of a document source file or the completion of the conversion of a document source file to an interactive document web application. |
| Control | eBookuploadform.html | An optional class that may collect user inputs for the submission of a completed application to a local or remote compiler service for the compilation of at least one interactive document web application package. |
| Control | Ebulwagsvc.php | May operate to deliver interactive document web application packages to the compiler service for the generation of application installers for a target OS. |

FIG. 11 further identifies various functions that may be defined for each object, e.g., +load( ) and +unload( ) in the webappauthoringtool object. Such functions are provided for the sake of illustration only, and should not be considered as limiting the scope of the present disclosure. As will be appreciated in the art, user interfaces that include more or less functions than the specific non-limiting example shown in FIG. 11 may be used in accordance with the web application development tools of the present disclosure.

Figure 12:
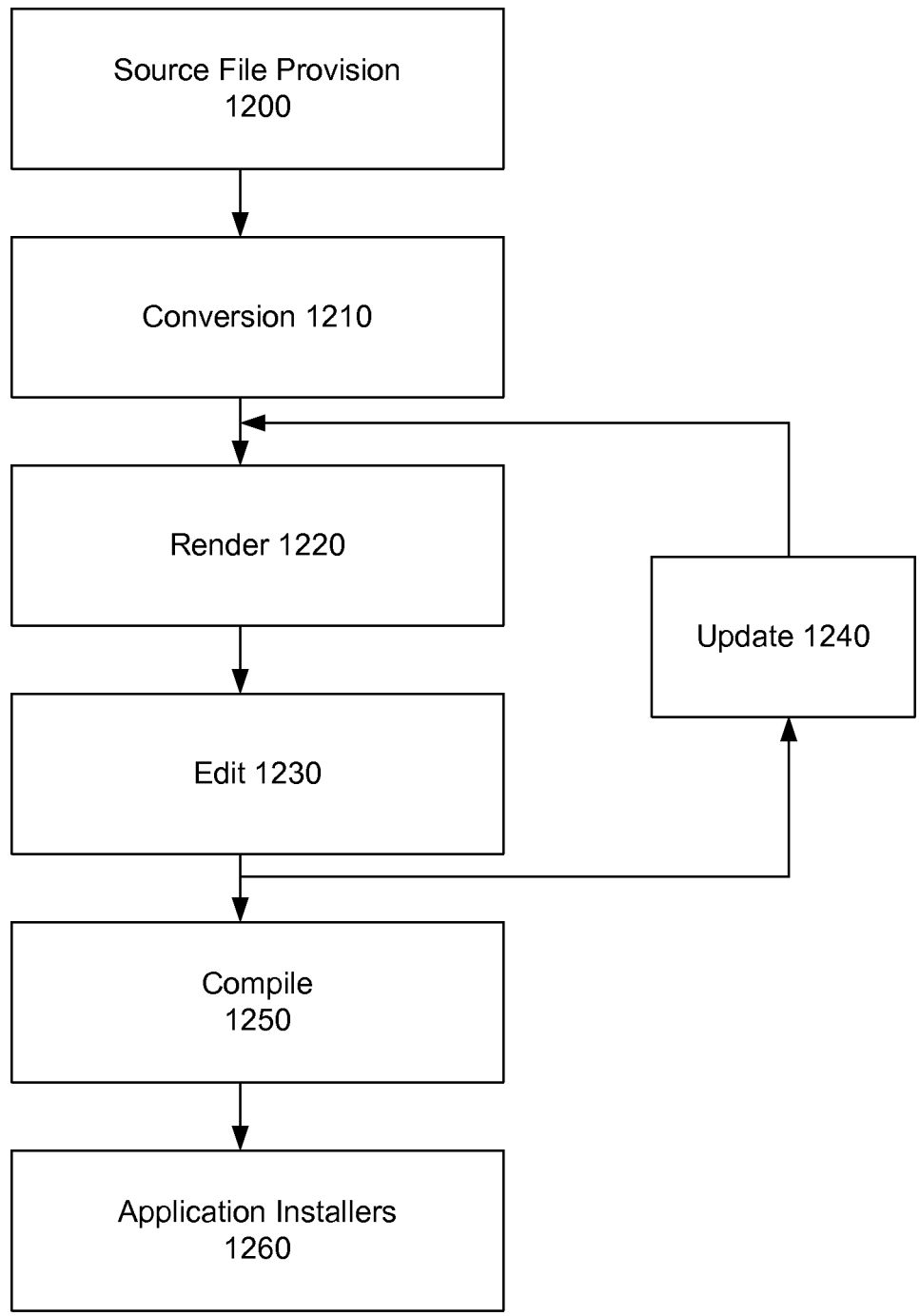
FIG. 12 is a block diagram of a method in accordance with non-limiting embodiments of the present disclosure.

Another aspect of the present disclosure relates to computer implemented methods of authoring interactive document web applications and compiling such applications into native files for multiple OSes and or form factors. In this regard, reference is made to FIG. 12 which provides a non-limiting example of a method in accordance with the present disclosure.

In source file provision step 1200, an electronic document source file (e.g. an epub, a pdf, etc.) is provided to a web application development tool in accordance with the present disclosure. The electronic document source file may be uploaded by a user, e.g., through the UI previously described, or provided through another means.

In conversion step 1210, a conversion service is invoked to extract data from the electronic document source file. For example, and as previously described, the conversion service may extract metadata, body text, images, and other information from the electronic document source file. This data may be used by the conversion service to generate an interactive web application including a table of contents, chapters, and other desired parts using a default or pre-selected style.

In render step 1220, a preview of the interactive document web application is rendered in a device simulator in accordance with the present disclosure. As noted above, this preview may be rendered with a default or preselected style. Later, the preview of the interactive document web application may be rendered to include edits made during editing step 1230, discussed below.

In editing step 1230, the preview of the interactive document web application may be edits using a user interface, as described above. For example, the resolution, orientation, style, and format (e.g., font, font size, etc.) of the interactive document web application may be altered. In addition, plugins (e.g., to social media web sites) may be inserted into the interactive document web application.

In update step 1240, the interactive document web application is updated (e.g., by a conversion service) to include the changes input during editing step 1230. The preview of the interactive document web application may then be refreshed.

Once no further edits are desired, the interactive document web application may be compiled into interactive web application packages and installers for selected OSes and form factors in compile step 1250. The end result is the provision of installers for the selected platforms, depicted in FIG. 12 as step 1260.

Another aspect of the present disclosure relates to machine-readable media containing instructions for performing the operations of the present disclosure, or containing code or design data which defines structures, circuits, apparatus, processors, and/or system features described herein. For example, the present disclosure contemplates articles comprising a machine readable medium having instructions stored thereon, which when executed by a processor cause the processor to execute operations consistent with the device simulators, web application development tools, and/or methods of the present disclosure.

The foregoing description makes reference to specific names (e.g., for the files, services, functions and objects described herein) and code. Such names and code are provided herein for the sake of discussion only, and should be considered exemplary. One of ordinary skill in the art will understand that any suitable name may be used for the files, services, and functions described herein, and that variations in the coding of the various features described herein are possible. Such variations are envisioned by the present disclosure and are incorporated herein.

Other embodiments of the present disclosure will be apparent to those skilled in the art from consideration of the specification and practice of the inventions disclosed herein. It is intended that the specification be considered as exemplary only, with a true scope and spirit of the invention being indicated by the following claims.

What is claimed is:

1. A system, comprising:
a processor;
a development display having a pixel-per-inch parameter;
a memory having device simulator instructions stored thereon, wherein when executed said device simulator instructions cause said processor to:
generate a user interface within a web browser, said user interface comprising at least one host frame and at least one scalar, wherein:
said at least one host frame is to be displayed on said development display and to contain a simulated display, the simulated display being a simulation of a physical display of a target device;
when the scalar is in a first position, convert the first position to a first zoom ratio based at least in part on a comparison of attributes of said physical display maintained in a database to at least said pixel per inch parameter, and apply said first zoom ratio to adjust the size of said at least one host frame such that the simulated display is inch-to-inch mapped with said physical display; and
when the scalar is in a second position, convert the second position to a second zoom ratio, and apply the second zoom ratio to said at least one host frame such that said simulated display is pixel-to-pixel mapped with said physical display.

2. The system of claim 1, wherein said device simulator instructions when executed further cause the processor to generate a plurality of device frames adjacent to said at least one host frame.

3. The system of claim 2, wherein said plurality of device frames contain images of a bezel of said target device.

4. The system of claim 1, wherein said device simulator instructions when executed further cause the processor to refresh said at least one host frame in response to an event associated with said scalar.

5. The system of claim 4, wherein said event associated with said scalar is chosen from the group consisting of a start, a stop, a movement, or a combination thereof.

6. The system of claim 4, wherein said at least one host frame is refreshed in real time in response to said event associated with said scalar.

7. The system of claim 1, wherein in response to applying said first zoom ratio to the at least one host frame, the at least one host frame is rendered on a display of said system with at least one dimension that differs from a corresponding dimension of physical display of said target device by about 5% or less.

8. The system of claim 1, wherein the development display has a first resolution, the physical display has a second resolution, and the first and second resolution differ from one another.

9. A method, comprising:
generating a user interface on a development display, the user interface comprising a scalar and host frame executed within a web browser, the host frame comprising a simulated display, the simulated display being a simulation of a physical display of a target device, said development display having a pixel-per-inch parameter;

determining, when the scalar is in a first position, a first zoom ratio based at least in part on a comparison of said pixel-per-inch parameter and attributes of said physical display stored in a database;

determining, when the scalar is in a second position, a second zoom ratio;

applying, when said scalar is in the first position, the first zoom ratio to the host frame so as to adjust the size of the host frame such that the simulated display is inch-to-inch mapped with said physical display; and applying, when said scalar is in the second position, the second zoom ratio to the host frame such that said simulated display is pixel-to-pixel mapped with said physical display.

10. The method of claim 9, further comprising:
displaying imagery of a bezel of said target device in at least one device frame adjacent to said at least one host frame.

11. The method of claim 9, further comprising refreshing the simulated display in response to a scalar event.

12. The method of claim 11, wherein said scalar event is selected from a start, a stop, a movement, or a combination thereof.

13. The method of claim 11, wherein said simulated display is refreshed in real time in response said scalar event.

14. The method of claim 9, wherein the development display has a first resolution, the physical display has a second resolution, and the first and second resolution differ from one another.

15. A method, comprising:
displaying, on a development display having a pixel-per-inch parameter, a user interface within a web browser executed by a processor, the user interface comprising a presentation layer and a rendering layer, the presentation layer comprising-hypertext markup language code, the rendering layer comprising dynamic code;

executing a simulated display within at least one host frame of said presentation layer, the simulated display comprising a simulation of a physical display of a target device;

detecting, with said rendering layer, a first position or a second position of a scalar;

when said scalar is in said first position, converting, with said rendering layer, said first position to a first zoom ratio based at least in part on a comparison of attributes of said physical display stored in a database to said pixel-per-inch parameter;

when said scalar is in said second position, converting, within said rendering layer, said second position to a second zoom ratio;

applying, when said scalar is in the first position, the first zoom ratio to the host frame so as to adjust the size of the host frame such that the simulated display is inch-to-inch mapped with said physical display; and applying, when said scalar is in the second position, the second zoom ratio to the host frame such that said simulated display is pixel-to-pixel mapped with said physical display.

16. The method of claim 15, further comprising:
displaying imagery of a bezel of said target device in at least one device frame adjacent to said at least one host frame.

17. The method of claim 15, further comprising:
refreshing the simulated display with said rendering layer in response to scalar event.

18. The method of claim 17, wherein said scalar event is selected from a start, a stop, a movement, or a combination thereof.

19. The method of claim 17, wherein the simulated display is refreshed in real time in response to said scalar event.

20. The method of claim 15, wherein the development display has a first resolution, the physical display has a second resolution, and the first and second resolution differ from one another.

* * * * *